US011784300B2

(12) United States Patent
Wi et al.

(10) Patent No.: US 11,784,300 B2
(45) Date of Patent: Oct. 10, 2023

(54) BATTERY INCLUDING MULTIPLE UNIT CELLS HAVING DIFFERENT CHARACTERISTICS IN ELECTRONIC CONDUCTIVITY OF ANODE AND ELECTRONIC DEVICE INCLUDING SAME

(71) Applicant: Samsung Electronics Co., Ltd., Gyeonggi-do (KR)

(72) Inventors: Sungun Wi, Gyeonggi-do (KR); Bookeun Oh, Gyeonggi-do (KR); Jaeyeon Lee, Gyeonggi-do (KR); Jaeman Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 424 days.

(21) Appl. No.: 16/523,477

(22) Filed: Jul. 26, 2019

(65) Prior Publication Data
US 2020/0035993 A1   Jan. 30, 2020

(30) Foreign Application Priority Data

Jul. 27, 2018   (KR) .......................... 10-2018-0087890

(51) Int. Cl.
*H01M 4/131* (2010.01)
*H01M 4/505* (2010.01)
(Continued)

(52) U.S. Cl.
CPC ............ *H01M 4/131* (2013.01); *H01M 4/133* (2013.01); *H01M 4/139* (2013.01); *H01M 4/505* (2013.01);
(Continued)

(58) Field of Classification Search
CPC ...... H01M 4/131; H01M 4/505; H01M 4/525; H01M 4/133; H01M 4/139; H01M 4/625;
(Continued)

(56) References Cited

U.S. PATENT DOCUMENTS

2010/0075210 A1   3/2010   Lee et al.
2012/0121964 A1*  5/2012   Park .................. H01M 10/0418
                                                    429/154
(Continued)

FOREIGN PATENT DOCUMENTS

JP   2008-305746   12/2008
JP   2011-216685   10/2011
(Continued)

OTHER PUBLICATIONS

English Translation of KR 20160076364.*
(Continued)

*Primary Examiner* — Kiran Quraishi Akhtar
(74) *Attorney, Agent, or Firm* — The Farrell Law Firm, P.C.

(57) ABSTRACT

A battery and an electronic device including a battery are provided. The battery includes a case including a first face and a second face; a first unit cell including a first cathode, a first separator, and a first anode, the first anode having a characteristic of a first electrical conductivity when the first unit cell is discharged; and a plurality of second unit cells, each including a second cathode, a second separator, and a second anode, the second anode having a characteristic of a second electrical conductivity lower than the first electrical conductivity when the plurality of second unit cells are discharged. The plurality of second unit cells are disposed within the case to be adjacent to the first face and the second face, respectively, and the first unit cell is interposed between the plurality of second unit cells.

15 Claims, 7 Drawing Sheets

(51) Int. Cl.
   *H01M 4/525* (2010.01)
   *H01M 10/0525* (2010.01)
   *H01M 4/133* (2010.01)
   *H01M 10/0587* (2010.01)
   *H01M 4/139* (2010.01)
   *H01M 4/62* (2006.01)
   *H01M 10/0585* (2010.01)

(52) U.S. Cl.
   CPC ........... *H01M 4/525* (2013.01); *H01M 4/625* (2013.01); *H01M 10/0525* (2013.01); *H01M 10/0585* (2013.01); *H01M 10/0587* (2013.01)

(58) Field of Classification Search
   CPC .... H01M 4/5825; H01M 4/485; H01M 4/587; H01M 10/0525; H01M 10/0587; H01M 10/0431; H01M 10/058; H01M 50/116; H01M 2004/021; H01M 2220/30; H01M 10/42; H01M 10/4207; H01M 10/4235; H01M 10/4242; H01M 10/0418; H01M 10/0413; H01M 10/0585; H01M 10/0436; Y02E 60/10; Y02P 70/50
   See application file for complete search history.

(56) References Cited

U.S. PATENT DOCUMENTS

| | | | |
|---|---|---|---|
| 2012/0202110 A1* | 8/2012 | Takeuchi | H01M 10/0568 429/185 |
| 2014/0072850 A1 | 3/2014 | Kwon et al. | |
| 2018/0083284 A1 | 3/2018 | Yamashita et al. | |
| 2018/0212213 A1* | 7/2018 | Kawai | H01M 10/441 |

FOREIGN PATENT DOCUMENTS

| | | | | |
|---|---|---|---|---|
| JP | 2012-160345 | | 8/2012 | |
| JP | 2012-190552 | | 10/2012 | |
| JP | 2018-049718 | | 3/2018 | |
| KR | 2008/0095967 | * | 10/2008 | ........ H01M 10/0459 |
| KR | 1020080095967 | | 10/2008 | |
| KR | 1020100071786 | | 6/2010 | |
| KR | 1020130118764 | | 10/2013 | |
| KR | 10-2013-0139796 | | 12/2013 | |
| KR | 2015/0045161 | * | 4/2015 | ........ H01M 10/0413 |
| KR | 1020150045161 | | 4/2015 | |
| KR | 20160076364 | * | 6/2016 | ........... H01M 10/04 |
| KR | 1020170021027 | | 2/2017 | |
| KR | 20-2018-0002007 | | 7/2018 | |
| WO | WO2017/057284 | * | 4/2017 | .......... H01M 10/052 |

OTHER PUBLICATIONS

English Translation of KR2008/0095967.*
English Translation of KR 2015/0045161.*
International Search Report dated Oct. 31, 2019 issued in counterpart application No. PCT/KR2019/009307, 7 pages.
European Search Report dated Dec. 12, 2019 issued in counterpart application No. 19188592.0-1108, 12 pages.
Indian Examination Report dated Oct. 31, 2022 issued in counterpart application No. 202117007510, 6 pages.
Korean Office Action dated Apr. 13, 2023 issued in counterpart application No. 10-2018-0087890, 14 pages.

* cited by examiner

BATTERY INCLUDING MULTIPLE UNIT CELLS HAVING DIFFERENT CHARACTERISTICS IN ELECTRONIC CONDUCTIVITY OF ANODE AND ELECTRONIC DEVICE INCLUDING SAME

CROSS-REFERENCE TO RELATED APPLICATION(S)

This application is based on and claims priority under 35 U.S.C. 119 to Korean Patent Application No. 10-2018-0087890, filed on Jul. 27, 2018, in the Korean Intellectual Property Office, the disclosure of which is incorporated herein by reference in its entirety.

BACKGROUND

1. Field

The disclosure relates generally to a secondary battery, and more particularly, to a rechargeable battery and an electronic device including the same.

2. Description of Related Art

Secondary chargeable/dischargeable batteries have been used as power sources for portable electronic devices, such as mobile terminals, laptop computers, tablet personal computers (PCs), etc., and are also commercially available power sources to replace fossil fuels in vehicles. In addition, secondary batteries can be utilized to store environmentally friendly energy from solar power generation, wind power generation, etc.

A secondary battery, e.g., a lithium ion battery, used in an electronic device, such as a mobile communication terminal, is composed of a combination of unit cells. In each of the unit cells, a cathode and a anode are arranged in a layered structure with a separator interposed therebetween. The secondary battery can be completed by winding the unit cells in a roll form or stacking multiple unit cells according to the specifications required for the electronic device.

In a lithium ion battery, a cathode may be implemented using a lithium cobalt oxide ($LiCoO_2$), and a anode may be implemented using graphite. The lithium cobalt oxide and graphite may be useful for fabricating a secondary battery having a high energy density due to a large difference in operating voltage.

However, when lithium ions are fixed (e.g., plated) to the graphite anode and form a dendrite, during charging or discharging of the lithium ion battery, the separator may become damaged and an internal short circuit may occur. The short circuit phenomenon occurring inside the lithium ion battery may cause heat generation, ignition, or thermal runaway.

In addition, a unit cell or a layered structure of the unit cell (e.g., a anode, or a stacked structure of a separator, a anode, etc.) may be deformed or the separator may be damaged due to an external factor (e.g., an external impact applied to the lithium ion battery). Such deformation or damage of the layered structure may cause the lithium ion fixation phenomenon.

SUMMARY

The disclosure has been made to address at least the disadvantages described above and to provide at least the advantages described below.

An aspect of the disclosure is to provide a secondary battery (e.g., a rechargeable battery) having improved safety.

Another aspect of the disclosure is to provide a secondary battery (e.g., a rechargeable battery) having improved safety while maintaining charge/discharge capacity and discharge performance.

In accordance with an aspect of the disclosure, a battery is provided, which includes a case including a first face and a second face; a first unit cell including a first cathode, a first separator, and a first anode, the first anode having a characteristic of a first electrical conductivity when the first unit cell is discharged; and a plurality of second unit cells, each including a second cathode, a second separator, and a second anode, the second anode having a characteristic of a second electrical conductivity lower than the first electrical conductivity when the plurality of second unit cells are discharged. The plurality of second unit cells may be disposed within the case to be adjacent to the first face and the second face, respectively, and the first unit cell is interposed between the plurality of second unit cells.

In accordance with another aspect of the disclosure, an electronic device is provided, which includes a circuit component, and a battery electrically connected to the circuit component. The battery includes a case including a first face and a second face; a first unit cell including a first cathode, a first separator, and a first anode, the first anode having a characteristic of a first electrical conductivity when the first unit cell is discharged; and a plurality of second unit cells, each including a second cathode, a second separator, and a second anode, the second anode having a characteristic of a second electrical conductivity lower than the first conductivity when the plurality of second unit cells are discharged. The plurality of second unit cells may be disposed within the case to be adjacent to the first face and the second face, respectively, and the first unit cell is interposed between the plurality of second unit cells.

In accordance with another aspect of the disclosure, a rechargeable battery is provided, which includes a case including a first face and a second face; an inner electrode assembly including a first unit cell, the first unit cell including a first cathode, a first separator, and a first anode, wherein the first cathode includes a lithium cobalt oxide, and the first anode includes graphite; and outer electrode assemblies, each including a second unit cell, which includes a second cathode, a second separator, and a second anode. The second anode may include a lithium titanium oxide. The outer electrode assemblies may be disposed within the case to be adjacent to the first face and the second face, respectively, and the inner electrode assembly may be interposed between the outer electrode assemblies. The charge or discharge capacity of the inner electrode assembly is at least 50% and no greater than 95% of a total charge or discharge capacity of the battery.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
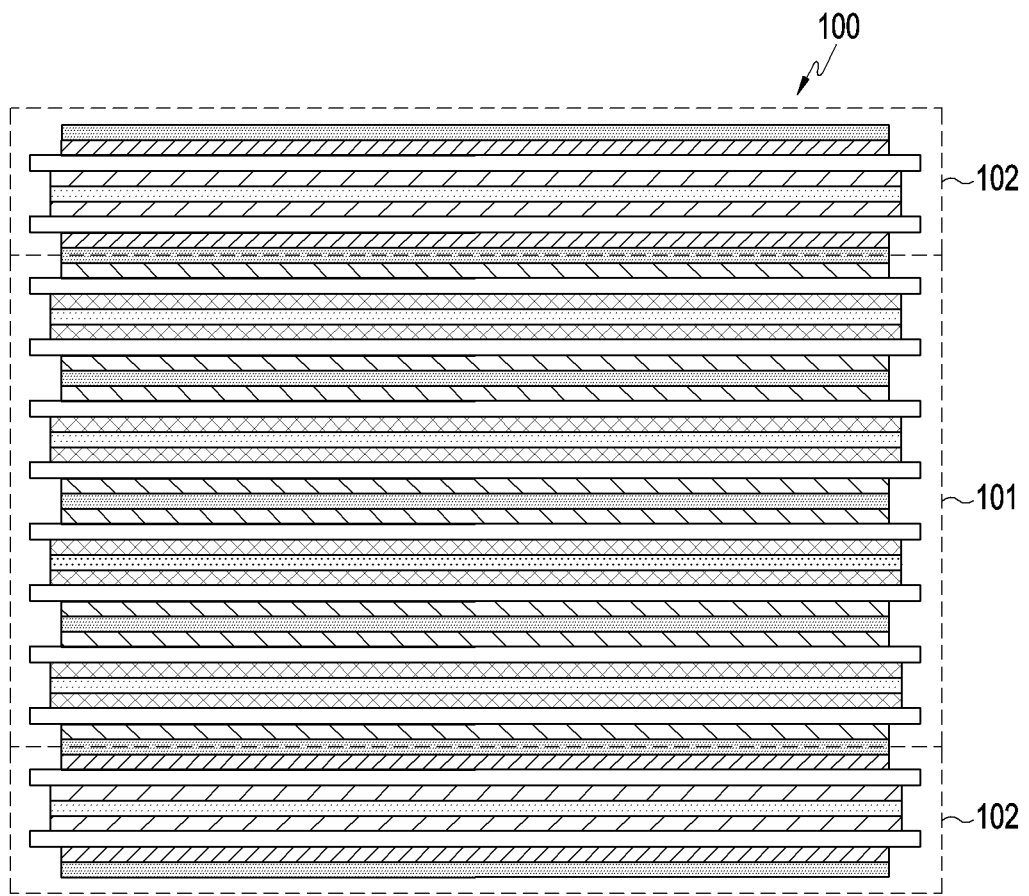
FIG. 1 illustrates a battery according to an embodiment.

As the disclosure allows for various changes and numerous embodiments, some various embodiments will be described in detail below with reference to the accompanying drawings. However, the disclosure is not limited to the specific embodiments, but includes all modifications, equivalents, and alternatives within the spirit and the scope of the disclosure.

In describing the drawings, similar reference numerals may be used to designate similar constituent elements.

A singular form of a noun corresponding to an item may include one or a plurality of the item, unless explicitly otherwise indicated in the related context.

Expressions, such as "A or B", at least one of A and B", "at least one of A or B", "A, B, or C", "at least one of A, B, and C", and "at least one of A, B, or C" may include all possible combinations of items enumerated together with the corresponding expression among the expressions.

Although ordinal terms such as "first" and "second" may be used to describe various elements, these elements are not limited by the terms. The terms are used merely for the purpose to distinguish an element from the other elements. For example, a first element may be referred to as a second element, and similarly, a second element may be also referred to as a first element without departing from the scope of the disclosure.

The term "and/or" includes any and all combinations of one or more associated items.

When an constituent element (e.g., a first element) is described as being "coupled" or "connected" to a different element (e.g., a second element), together with a term "functionally" or "communicatively" or without such a term, the first element may be connected to the second element directly (e.g., in a wired manner), wirelessly, or through a third constituent element.

Relative terms, such as "a front surface", "a rear surface", "a top surface", "a bottom surface", etc., which are described with respect to the orientation in the drawings may be replaced by ordinal numbers such as first and second. In the ordinal numbers such as first and second, their order are determined in the mentioned order or arbitrarily and may not be arbitrarily changed if necessary.

In the description, the terms "include" or "have" indicate the existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meanings as those understood by a person skilled in the art to which the disclosure belongs. Terms defined in a generally used dictionary are to be interpreted to have the same meanings as the contextual meanings in the relevant field of art, and are not to be interpreted to have ideal or excessively formal meanings unless clearly defined in the specification.

In the disclosure, an electronic device may be referred to as a terminal, a portable terminal, a mobile terminal, a communication terminal, a portable communication terminal, a portable mobile terminal, a touch screen, etc.

For example, the electronic device may be a smartphone, a portable phone, a game player, a television (TV), a display unit, a heads-up display unit for a vehicle, a notebook computer, a laptop computer, a tablet PC, a personal media player (PMP), a personal digital assistant (PDA), etc. The electronic device may be implemented as a portable communication terminal which has a wireless communication function and a pocket size. Further, the electronic device may be a flexible device or a flexible display device.

According to an embodiment, stability of a rechargeable battery (e.g., a secondary battery) is improved by including outer electrode assemblies, each including a heterogeneous cathode or a heterogeneous anode. For example, by disposing a lithium phosphate (e.g., $LiCo_xMn_yFe_zPO_4$), which has an olivine structure and contains a transition metal, as a cathode and disposing a lithium titanium oxide ($Li_4Ti_5O_{12}$) as a anode, it is possible to mitigate a change in volume during a charging or discharging operation, and to suppress the expansion of a short circuit area even if the short circuit occurs. A pair of outer electrode assemblies described above may be disposed with an inner electrode assembly, which has a lithium cobalt oxide as an cathode and graphite as a anode, therebetween. For example, it is possible to secure a high energy density through the inner electrode assembly, and it is possible to relive or hinder an external impact or the like from being transferred to the inner electrode assembly using a high safety outer electrode assembly.

Figure 2:
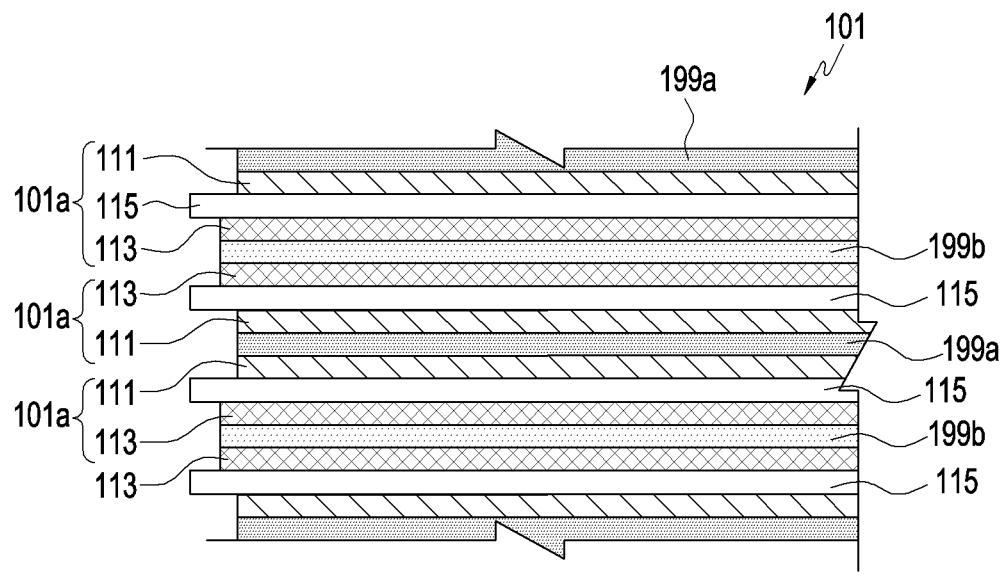
FIG. 2 illustrates an inner electrode assembly in the battery of FIG. 1.
Figure 3:
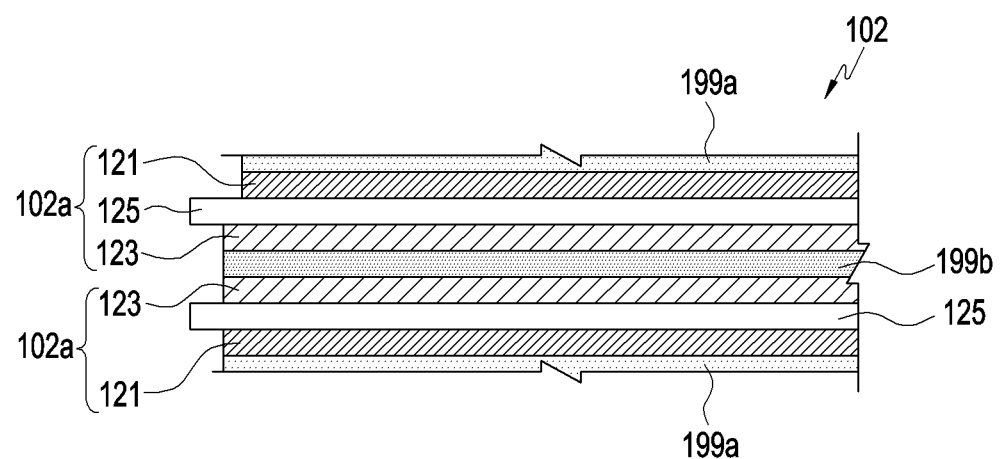
FIG. 3 illustrates an outer electrode assembly in the battery of FIG. 1.

FIG. 1 illustrates a battery according to an embodiment. FIG. 2 illustrates an inner electrode assembly in the battery of FIG. 1. FIG. 3 illustrates an outer electrode assembly in the battery of FIG. 1.

Referring to FIG. 1, a secondary battery, e.g., a rechargeable battery 100, includes an inner electrode assembly 101 and one or more electrode assemblies 102 stacked with the inner electrode assembly 101. In FIG. 1, a pair of the outer electrode assemblies 102 are disposed to face each other with the inner electrode assembly 101 interposed therebetween. Accordingly, the outer electrode assembly 102 is disposed on upper and lower faces of the inner electrode assembly 101.

In describing embodiments herein, the terms "inner electrode assembly" and "outer electrode assembly" are used. However, the inner electrode assembly 101 may be "a first unit cell (e.g., a first unit cell 101*a* in FIG. 2)" or a "combination of first unit cells," which will be to be described later, and the outer electrode assembly 102 may be "a second unit cell (e.g., a second unit cell 102*a* in FIG. 3)" or a "combination of second unit cells", which will be described later.

Referring to FIGS. 1 and 2, the inner electrode assembly 101 includes at least one first unit cell 101*a* (e.g., multiple first unit cells 101*a*). For example, the inner electrode assembly 101 may be formed by stacking multiple first unit cells 101*a*.

The first unit cell 101*a* includes a first cathode 111, a first separator 115, and a first anode 113, and the first separator 115 are disposed between the first cathode 111 and the first anode 113 so as to provide an insulating structure. The first cathode 111 may include a lithium cobalt oxide (e.g., $LiCoO_2$), and the second anode 113 may include graphite. The first separator 115 may be formed of a non-conductive porous body having pores while being resistant against an electrolyte or a positive or negative pole material. Although there is a slight difference depending on the number of the stacked first unit cells 101a, an actual fabrication size, etc., the inner electrode assembly 101 described above may implement a secondary battery having an output voltage of about 3.5 V or more and about 4.5 V or less in an electronic device, such as a commercialized mobile communication terminal.

The volume of the inner electrode assembly 101 (or the stacked number of first unit cells 101a) is in the range of about 50% or more and about 95% or less of the sum of the volume of the inner electrode assembly 101 and the volume of the outer electrical assembly 102 (the sum of the stacked number of first unit cells 101a and the stacked number of second unit cells 102a).

A first substrate 199a or a second substrate 199b are interposed between two adjacent first unit cells 101a. When two first unit cells 101a are stacked such that the first cathodes 111 face each other, the first substrate 199a may be interposed between the two adjacent first unit cells 101a. However, when two first unit cells 101a are stacked such that the first anodes 113 face each other, the second substrate 199b may be interposed between the two adjacent first unit cells 101a. For example, the first cathodes 111 may be disposed on opposite faces of the first substrate 199a, respectively, and the first anodes 113 may be disposed on opposite faces of the second substrate 199b, respectively. The first substrate 199a may be formed using an aluminum (Al) material, and the second substrate 199b may be formed using a copper (Cu) material.

Referring to FIGS. 1 and 3, the outer electrode assembly 102 includes at least one second unit cell 102a. For example, the outer electrode assembly 102 may be formed by stacking the plurality of second unit cells 102a.

The second unit cell 102a includes a second cathode 121, a second separator 125, and a second anode 123, and the second separator 125 is disposed between the second cathode 121 and the second anode 123 so as to provide an insulating structure. The second cathode 121 may include a lithium phosphate containing a transition metal. Cobalt, manganese, iron, etc., may be used as the transition metal contained in the lithium phosphate.

The lithium phosphate containing the transition metal may be a composition represented by a chemical formula of $LiCo_xMn_yFe_zPO_4$, wherein conditions of $0 \leq x \leq 1$, $0 \leq y \leq 1$, $0 \leq z \leq 1$, and $x+y+z=1$ may be satisfied. The second anode 123 may include a lithium titanium oxide (e.g., $Li_4Ti_5O_{12}$).

Since the second separator 125 is similar to the first separator 115, a detailed description thereof will be omitted.

Although there is a slight difference depending on the number of the stacked second unit cells 102a, an actual fabrication size, etc., the outer electrode assembly 102 described above may implement a secondary battery having an output voltage of about 3 V, if the outer electrode assembly 102 is fabricated to have a size similar to that of the inner electrode assembly 101 described above. The output voltage of the outer electrode assembly 102 may be variously designed depending on the ratio of the transition metal contained in the second cathode 121 or the like.

Multiple outer electrode assemblies 102 may be connected in series to have an output voltage of about 4 V (e.g., 3.8 V).

The volume of the outer electrode assembly 101 (or the stacked number of second unit cells 102a) is in the range of about 5% or more and about 50% or less of the sum of the volume of the inner electrode assembly 101 and the volume of the outer electrical assembly 102 (the sum of the stacked number of first unit cells 101a and the stacked number of second unit cells 102a).

The outer electrode assembly 102 having the series connection structure described above may have fewer changes in electrical characteristics according to a temperature change. For example, even in a low temperature environment, the outer electrode assembly 102 having the series connection structure is able to supply stable power.

A lithium titanium oxide constituting the second anode 123 has substantially no volume change in a charging or discharging operation, and may have an electrical conductivity lower than that of graphite (e.g., the first anode 113), regardless of whether or not charging or discharging is performed. Lithium may have a characteristic that the electrical conductivity thereof in the discharged state becomes lower than that in the charged state. This characteristic of the lithium titanium oxide may be used to suppress the expansion of a short-circuited region or area, even if a short circuit (e.g., an internal short circuit) occurs, and may be used to suppress a rapid discharge phenomenon. For example, by forming the second anode 123 with a lithium titanium oxide, it is possible to secure higher safety to protect against heat generation, ignition, or thermal runaway than that in a graphite-based unit cell (e.g., the first unit cell 101a) or electrode assembly.

Because lithium titanium oxide reacts at a higher voltage than the voltage at which the graphite material reacts, e.g., by about 1 V or higher, the energy density of an electrode assembly using the lithium titanium oxide as the anode may be lower than that of an electrode assembly or a secondary battery using the graphite material as the anode. This reduction of the energy density may be at least partially compensated for by forming the second cathode 121 using a lithium phosphate having an olivine structure containing a transition metal. Accordingly, with a unit cell (e.g., the second unit cell 102a) having the second cathode 121, which is formed of a lithium iron phosphate ($LiFePO_4$) having an olivine structure reacting at a voltage of about 3.4 V, and the second anode 123, which is formed of a lithium titanium oxide, it is possible to secure an output voltage of about 1.9 V.

The electrode assembly (e.g., the outer electrode assembly 102) composed of unit cells formed by the combination of the above-described components may be used for power supply of a commercialized electronic device by connecting the plurality of second unit cells 102a in series. For example, it is possible to implement a secondary battery having an output voltage of approximately 4 V by connecting the plurality of second unit cells 102a or the outer electrode assemblies 102 having an output voltage of about 1.9 V in series.

A secondary battery (e.g., the outer electrode assembly 102) in which the second cathode 121 and the second anode 123 are formed of the above-described compositions will have a substantially constant output voltage in the entire discharge section. The energy density of the outer electrode assembly 102 may be somewhat lower than that of the inner electrode assembly 101 due to the characteristics of the above-mentioned electrode compositions, which may be compensated for by connecting multiple outer electrode assemblies 102 in series.

Similar to the structure of the inner electrode assembly 101, a first substrate 199a or a second substrate 199b may be interposed between two adjacent second unit cells 102a. In stacking the inner electrode assembly 101 and the outer electrode assembly 102, the first cathode 111 and the second cathode 121 may be disposed to face each other with the first substrate 199*a* interposed therebetween. Alternatively, in stacking the inner electrode assembly 101 and the outer electrode assembly 102, the first anode 111 and the second anode 121 may be disposed to face each other with the second substrate 199*b* interposed therebetween. The arrangement of the substrates interposed between the two adjacent second unit cells 102*a* is substantially similar to the arrangement of the first substrate 199*a* and the second substrate 199*b* of the inner electrode assembly 101 described above, and thus a detailed description thereof will be omitted.

Figure 4:
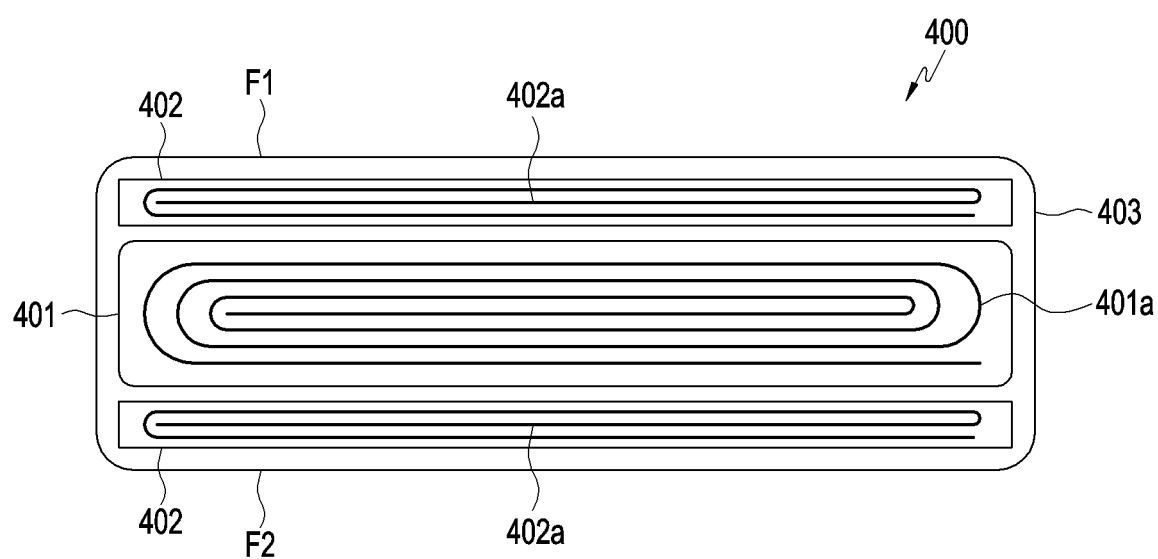
FIG. 4 illustrates a battery according to an embodiment.

FIG. 4 illustrates a battery according to an embodiment.

Referring to FIG. 4, a battery 400 includes a case 403, and an inner electrode assembly 401 and outer electrode assemblies 402, which are encapsulated by the case 403. The case 403 includes a first face F1 and a second face F2, and may include a pouch or a can structure that encapsulates the inner electrode assembly 401 and the outer electrode assemblies 402 in the space between the first face F1 and the second face F2. Inside the case 403, the multiple outer electrode assemblies 402 may be disposed to face each other with the inner electrode assembly 401 interposed therebetween. For example, a pair of outer electrode assemblies may be disposed adjacent to the first face and the second face, respectively. The outer electrode assemblies 402 may be disposed between the first face F1 and the inner electrode assembly 401 and between the second face F2 and the inner electrode assembly 401, respectively.

The inner electrode assembly 401 includes at least one first unit cell 401*a*. The inner electrode assembly 401 is formed by winding one first unit cell 401*a* (e.g., a jelly-roll structure), and a portion of the first unit cell 401*a* may include a structure stacked with another portion of the first unit cell 401*a*. Since the interlayer structure of the first unit cell 401*a* is similar to that of the first unit cell 101*a* of FIG. 2, a detailed description thereof will be omitted.

The inner electrode assembly 401 may also be formed by stacking the plurality of first unit cells 401*a*, which are flat and unwound, similar to the stacked structure of FIG. 2. The inner electrode assembly 401 may also be formed by stacking the plurality of first unit cells 401*a*, which are wound.

The outer electrode assembly 402 includes at least one second unit cell 402*a*. The outer electrode assembly 402 is formed by winding one second unit cell 402*a*, and a portion of the second unit cell 402*a* may include a structure stacked with another portion of the second unit cell 402*a*. The outer electrode assembly 402 may also be formed by stacking the plurality of second unit cells 402*a*, similar to the stacked structure of FIG. 3. The inner electrode assembly 401 may also be formed by stacking the plurality of second unit cells 402*a*, which are wound. The outer electrode assemblies 402 may be disposed respectively adjacent to the first face F1 and the second face F2 with the inner electrode assembly 401 interposed therebetween.

Similar to the preceding embodiments, the outer electrode assemblies 402 may have a lower energy density and a higher electrical stability compared to the inner electrode assembly 401. For example, if the inner electrode assembly 401 includes a structure having a cathode formed of a lithium cobalt oxide and a anode formed of graphite, the outer electrode assemblies 402 may include a structure having a cathode formed of a lithium phosphate containing a transition metal and a anode formed of a lithium titanium oxide. By disposing the outer electrode assemblies 402 in outer sides of the battery 400, it is possible to relieve or prevent an external impact or the like from being transmitted to the inner electrode assembly 401. For example, it is possible to prevent the first unit cell 401*a* from being damaged through the arrangement of high safety outer electrode assemblies 402.

The inner electrode assembly 401 is at least partially enclosed by the outer electrode assemblies 402 and may have a high energy density. Thus, the composition or arrangement of the inner electrode assembly 401 and the outer electrode assemblies 402 may enable the battery 400 to be safer than a secondary battery based on a structure having a anode formed of graphite while ensuring a higher energy density of the battery 400.

In order to improve the safety, for example, in order to hinder an external impact from being transmitted to the inner electrode assembly or the first unit cell, the stacked number or wound number of second unit cells may be about 5% or more of the total stacked or wound number. Here, the "total stacked number" may refer to the sum of the numbers of first unit cells 101*a* and second unit cells 102*a* stacked as illustrated in FIG. 1. The "total wound number" may refer to the sum of the wound number of first unit cells 401*a* and the wound number of second unit cells 402*a* in FIG. 4.

In order to suppress energy density degradation, the charge or discharge capacity of the inner electrode assembly may be about 50% or more of the total charge or discharge capacity of the battery. Considering these conditions, the stacked or wound number of second unit cells may be about 5% or more and about 50% or less of the total stacked or wound number, or the volume or charge or discharge capacity of the inner electrode assembly may be about 50% or more and 95% or less of the total volume or charge or discharge capacity of the battery.

The battery described above may be provided in an electronic device in order to supply power to circuit elements or electrical components of the electronic device (e.g., a processor, memory, a sound output device, a display device, an audio module, a sensor module, an interface, a haptic module, a camera module, or a communication module). The battery may be provided in an electronic device in order to supply power to the circuit components or electrical components described above while being controlled by a circuit element of the electronic device, e.g., a power management module.

Figure 5:
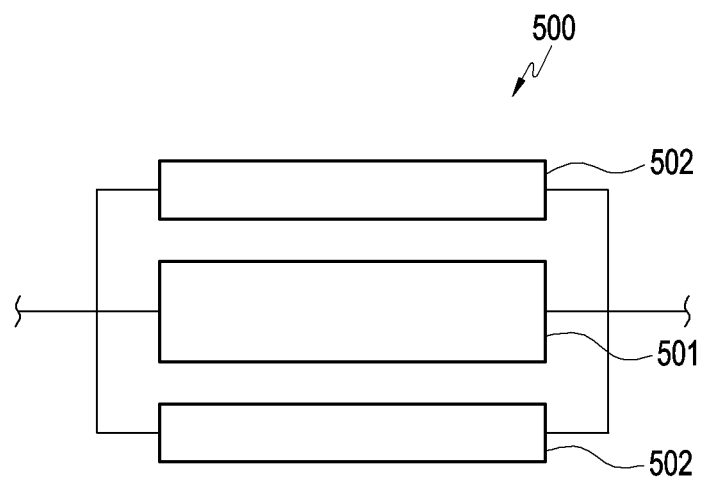
FIGS. 5 and 6 illustrate a connection structure between an inner electrode assembly and an outer electrode assembly in a battery according to an embodiment.
Figure 6:
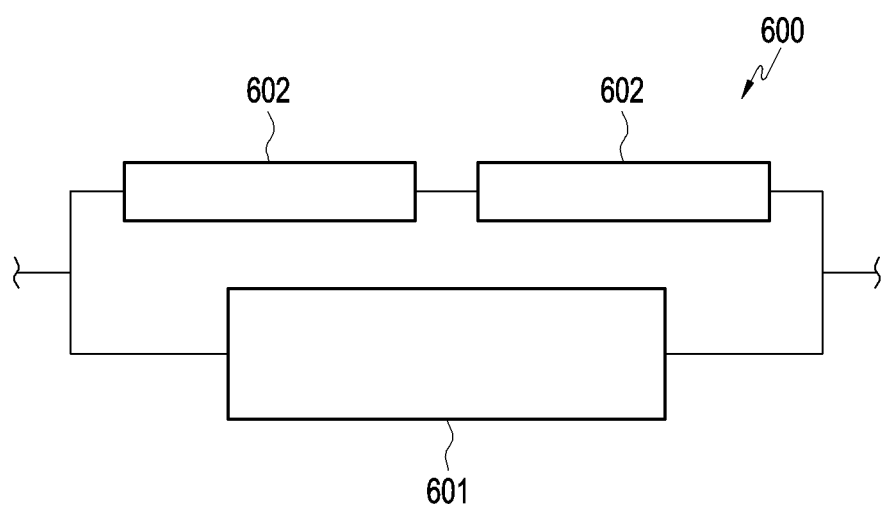

FIGS. 5 and 6 illustrate a connection structure between an inner electrode assembly and outer electrode assemblies in a battery according to an embodiment.

More specifically, FIGS. 5 and 6 illustrate an electrical connection structure between an inner electrode assembly 501 or 601 and outer electrode assemblies 502 or 602, in which an actual arrangement structure of the inner electrode assembly 501 or 601 and the outer electrode assemblies 502 or 602 may be different from those illustrated in the drawings. For example, the actual arrangement of the inner electrode assembly 501 or 601 and the outer electrode assemblies 502 or 602 may be similar or identical to the arrangement illustrated in FIG. 1 or FIG. 4.

Referring to FIG. 5, the battery 500 includes a structure in which the inner electrode assembly 501 and the outer electrode assemblies 502 are connected in parallel. Each outer electrode assembly 502 includes a cathode formed of a lithium phosphate containing a transition metal and a anode formed of a lithium titanium oxide, and has an energy density (e.g., a lower output voltage) than that of the inner electrode assembly 501. However, the outer electrode assembly 500 may have a characteristic of outputting a relatively constant voltage in the entire discharge section (or discharge time) of the battery 500. For example, it is possible to provide a stable power supply even when there is a change in the external environment such as temperature.

Referring to FIG. 6, in the battery 600, multiple (e.g., a pair of) outer electrode assemblies 602 are connected in series, and the inner electrode assembly 601 are connected in parallel with the series connection structure of the outer electrode assemblies 602. For example, the low energy density or low output voltage of the outer electrode assemblies 602 themselves may be compensated for by serially connecting multiple outer electrode assemblies 602.

Figure 7:
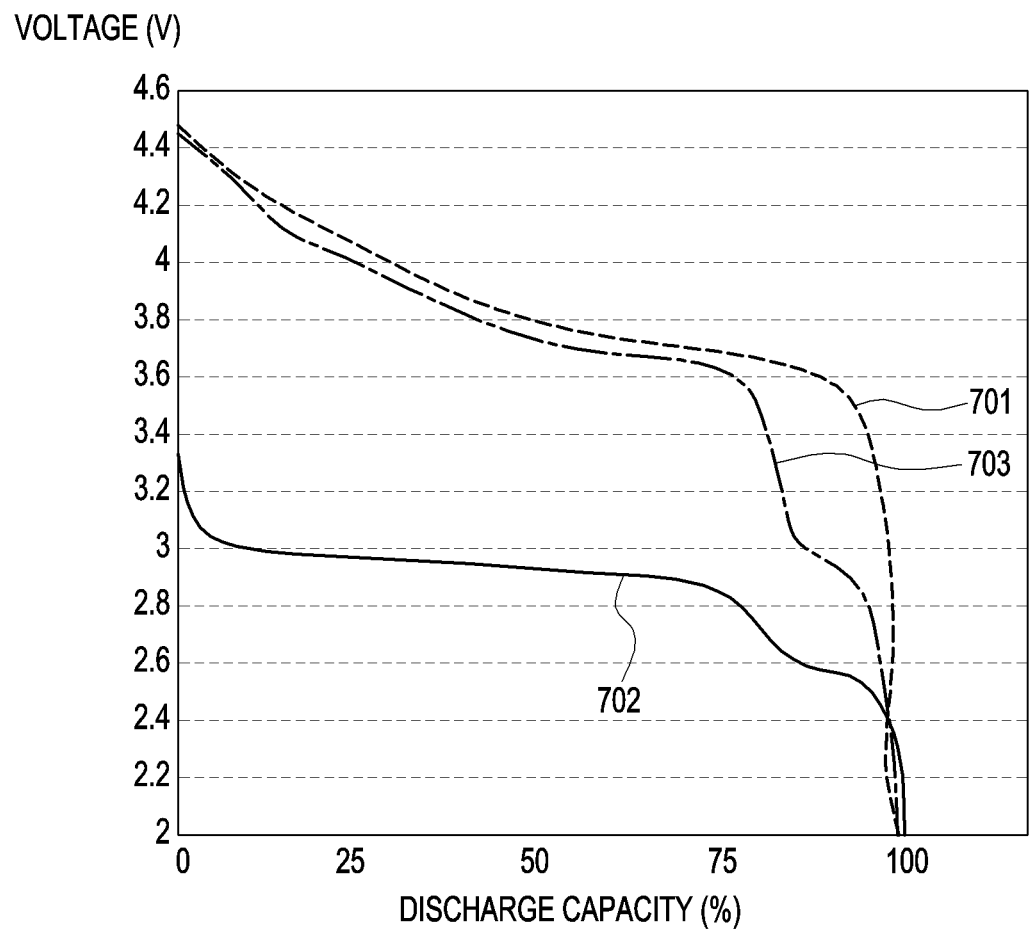
FIGS. 7 and 8 are graphs illustrating discharge characteristics of a battery according to an embodiment.
Figure 8:
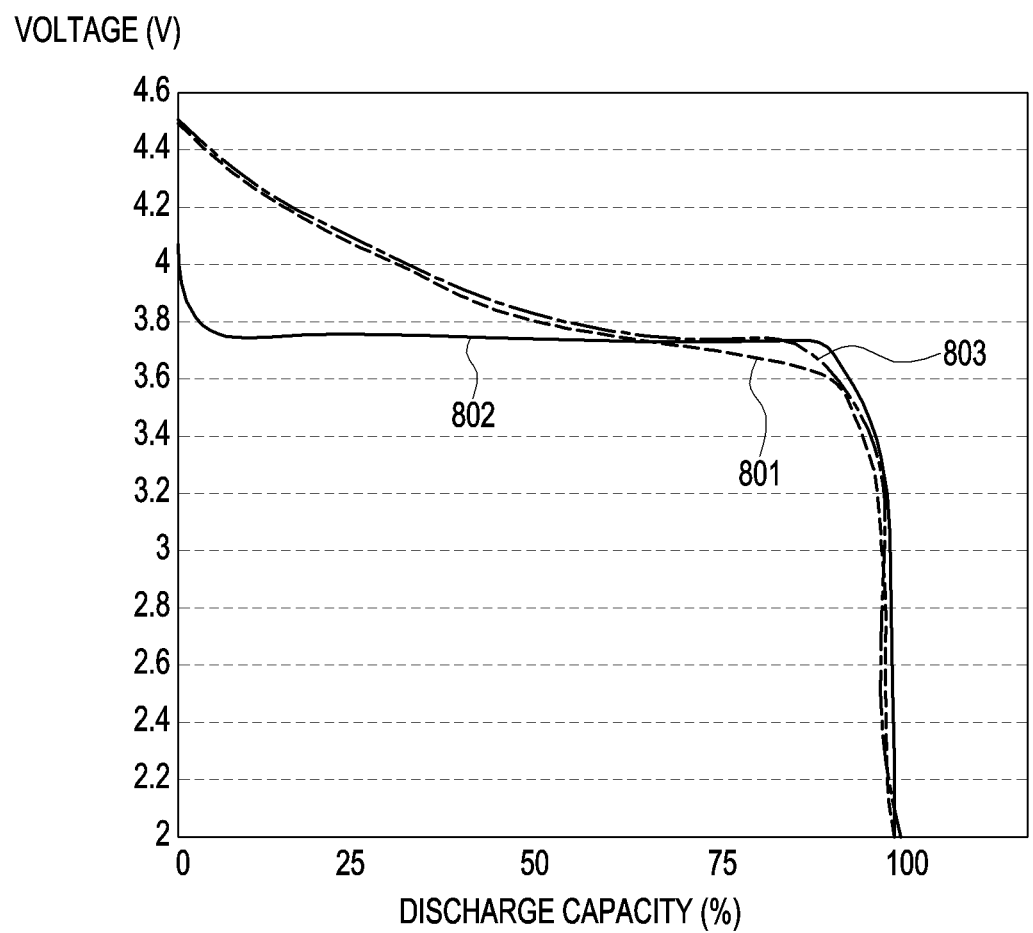

FIGS. 7 and 8 are graphs illustrating discharge characteristics of a battery according to an embodiment.

Referring to FIG. 7, graph 701 shows the discharge characteristic of a battery only including unit cells, each composed of a cathode formed of a lithium cobalt oxide and a anode formed of graphite. Based on graph 701, a battery based on a lithium cobalt oxide-graphite has a high energy density. However, as described above, when an internal short circuit due to an external shock occurs, there may be a risk of heat generation or ignition.

Graph 702 shows the discharge characteristic of a battery only including unit cells, each composed of a cathode formed of a lithium phosphate having an olivine structure and a anode formed of a lithium titanium oxide. Based on graph 702, a battery based on a lithium phosphate-lithium titanium oxide may have a low energy density, but may have a relatively constant output voltage over the entire discharge section (or discharge time). As described above, it is possible to suppress the heat generation or ignition even if an internal short circuit or the like occurs.

As described above, a battery may include unit cells based on a lithium phosphate-lithium titanium oxide, and unit cells based on a lithium cobalt oxide-graphite. The plurality of second unit cells 102a and 402a are disposed on the surface sides (e.g., the first face F1 and the second face F2 in FIG. 4) of the case, so that it is possible to relieve an external impact applied to the first unit cells 101a or 401a or to hinder an external impact from reaching the first unit cells 101a or 401a. For example, the batteries 100 and 400 may have higher safety than batteries having discharge characteristics of graph 701.

Graph 703 shows the discharge characteristic of a battery in which the stacked number or wound number of second unit cells 102a or 402a is about 20% of the total stacked number or wound number. Specifically, graph 703 shows the discharge characteristic of the battery 500 having the parallel connection structure of FIG. 5.

Referring to graph 703, the battery has an energy density, which is somewhat lower than that of a battery based on a lithium cobalt oxide-graphite, but has a charge or discharge capacity close to that of the battery based on a lithium cobalt oxide-graphite. For example, the batteries have performance similar to that of a battery based on a lithium cobalt oxide-graphite in charge or discharge capacity while also having improved safety.

Referring to FIG. 8, graph 801 shows the discharge characteristic of a battery only including unit cells, each consisting of a cathode formed of a lithium cobalt oxide and a anode formed of graphite. Since graph 801 may be substantially the same as graph 701, a detailed description thereof will be omitted.

Graph 802 shows the discharge characteristic of a battery having a configuration in which a pair of unit cells, each composed of a cathode formed of a lithium phosphate having an olivine structure and containing a transition metal and a anode formed of a lithium titanium oxide, are connected in series.

Comparing graph 802 with graph 702, it can be seen that it is possible to secure a higher energy density (e.g., an output voltage) by connecting the unit cells based on a lithium phosphate-lithium titanium oxide in series. In such a series connection structure, the battery may have a relatively constant output voltage in the entire discharge section (or discharge time). As described above, the anode is formed of a lithium titanium oxide having a lower electrical conductivity than that of graphite, and thus it is possible to suppress heat generation or ignition even if an internal short circuit occurs.

A battery (may include unit cells based on a lithium phosphate-lithium titanium oxide, and unit cells based on a lithium cobalt oxide-graphite. The plurality of second unit cells 102a and 402a are disposed on the surface sides F1 and F2 of the case 403 while being connected in series, so that it is possible to hinder or relieve an external impact applied to the first unit cells 101a or 401a. For example, the batteries 100 and 400 may be safer than batteries having discharge characteristics of graph 701.

Graph 803 shows the discharge characteristic of a battery 600 in which the stacked number or wound number of second unit cells 102a or 402a is about 20% of the total stacked number or wound number and which has the connection structure of FIG. 6 (e.g., a series/parallel connection structure).

Referring to graph 803, it can be seen that the batteries having a serial/parallel connection structure have a charge or discharge capacity substantially equal to that of the battery based on a lithium cobalt oxide-graphite. In addition, the batteries provide an output voltage more stably without degrading the output voltage compared with a battery based on a lithium cobalt oxide-graphite in the section in which discharge of about 75% or more is performed. For example, the batteries may have improved safety, as well as an improved discharge characteristic compared to that of a battery based on a lithium cobalt oxide-graphite according to the connection structure between unit cells or between an inner electrode structure and outer electrode structures.

Figure 9:
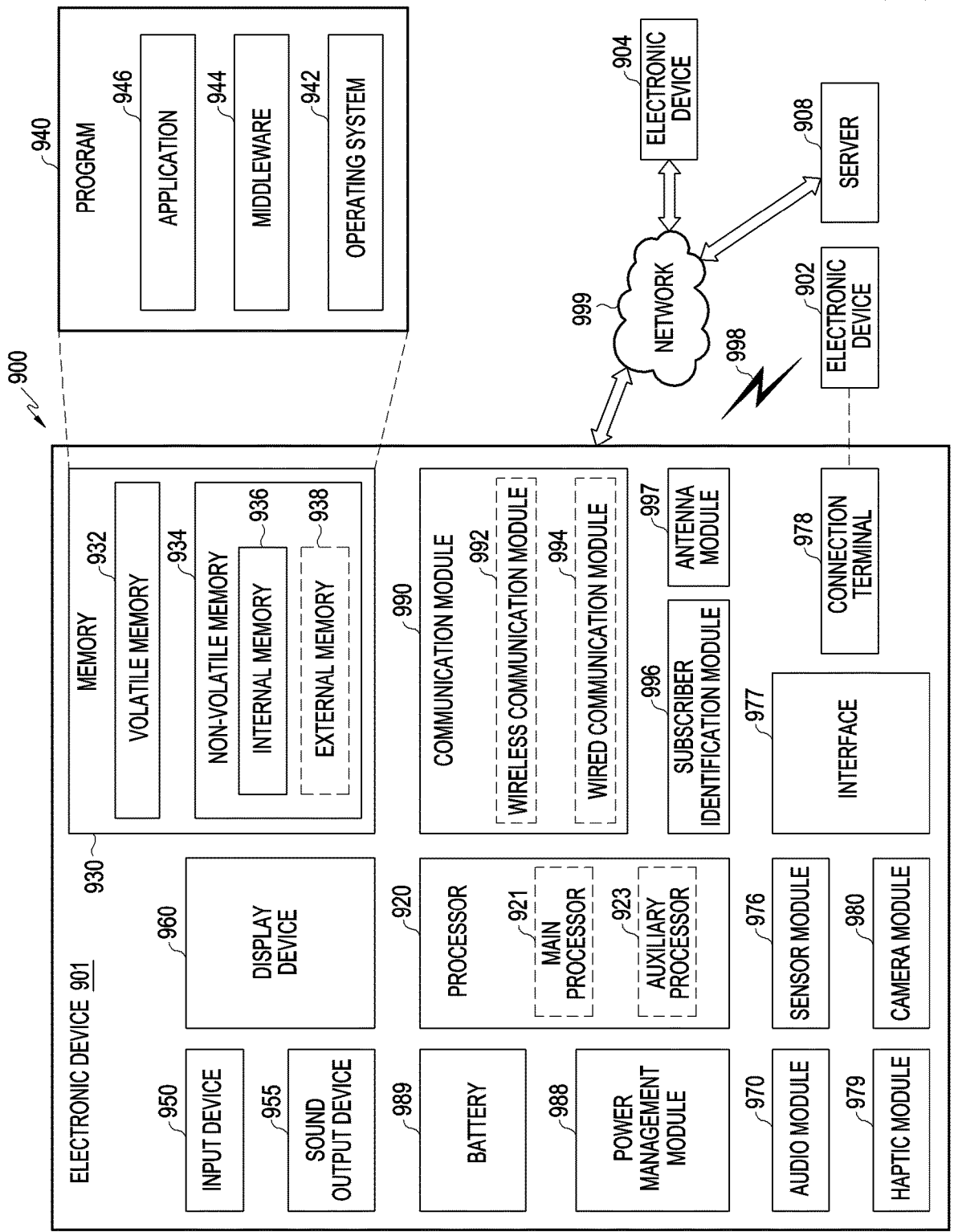
FIG. 9 illustrates an electronic device within a network environment according to an embodiment.

FIG. 9 illustrates an electronic device in a network environment, according to an embodiment.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

According to an embodiment, a battery may include a case including a first face and a second face; at least one first unit cell including a first cathode, a first separator, and a first anode, the first anode having a characteristic of a first electrical conductivity in the state in which the first unit cell is discharged; and a plurality of second unit cells each including a second cathode, a second separator, and a second anode, the second anode having a characteristic of a second electrical conductivity lower than the first electrical conductivity in a state in which the plurality of second unit cells are discharged. The plurality of second unit cells may be disposed within the case to be adjacent to the first face and the second face, respectively, and the at least one first unit cell may be interposed between the plurality of second unit cells.

The first anode may include graphite, and the second anode may include a lithium titanium oxide.

A first one of the plurality of second unit cells is disposed adjacent to the first face and a second one of the plurality of second unit cells is disposed adjacent to the second face. The first one of the plurality of second unit cells and the second one of the plurality of second unit cells may be connected in series with each other, and the first unit cell may be connected in parallel with a series connection structure of the first one of the plurality of second unit cells and the second one of the plurality of second unit cells.

The second cathode may include a lithium phosphate having an olivine structure and containing at least one of cobalt, manganese, and iron, and the second anode may include a lithium titanium oxide.

The first cathode may include a lithium cobalt oxide, and the first anode may include graphite.

The at least one first unit cell may be wound to include a stacked structure in which a portion of the first unit cell is stacked with another portion of the first unit cell, and at least one of the plurality of second unit cells may be wound to include a stacked structure in which a portion of the at least one of the plurality of second unit cells is stacked with another portion of the at least one of the plurality of the second unit cells.

The wound number of the plurality of second unit cells may be about 5% or more and about 50% or less of the sum of the wound number of the at least one first unit cell and the wound number of the plurality of second unit cell.

A plurality of first unit cells may be stacked, and the plurality of second unit cells may be stacked together with the first unit cells.

The stacked number of the plurality of second unit cells may be about 5% or more and about 50% or less of the sum of the stacked number of first unit cells and the stacked number of the plurality of second unit cells.

The second cathode includes a lithium phosphate having an olivine structure and containing at least one of cobalt, manganese, and iron. The lithium phosphate may be a composition of "LiCo$_x$Mn$_y$Fe$_z$PO$_4$", and the following conditions may be satisfied: 0≤x≤1, 0≤y≤1, 0≤z≤1, and x+y+z=1.

The second anode may include a lithium titanium oxide having a composition of Li$_4$Ti$_5$O$_{12}$.

The first cathode may include a lithium cobalt oxide and the first anode may include graphite.

The case may include a pouch or a can structure that encapsulates the at least one first unit cell and the plurality of second unit cells.

The second anode may include a material which has an electrical conductivity that is lower in a discharged state than in a charged state.

According to an embodiment, an electronic device may include at least one circuit component, and a battery electrically connected to the at least one circuit component. The battery may include a case including a first face and a second face; at least one first unit cell including a first cathode, a first separator, and a first anode, the first anode having a characteristic of a first electrical conductivity in a state in which the first unit cell is discharged; and a plurality of second unit cells each including a second cathode, a second separator, and a second anode, the second anode having a characteristic of a second electrical conductivity lower than the first electrical state in a state in which the plurality of second unit cells are discharged. The plurality of second unit cells may be disposed within the case to be adjacent to the first face and the second face, respectively, and the at least one unit cell may be interposed between the plurality of second unit cells.

The first anode may include graphite, and the second anode may include a lithium titanium oxide.

The second cathode may include a lithium phosphate having an olivine structure and containing at least one of cobalt, manganese, and iron.

The second cathode may include a composition of "LiCo$_x$Mn$_y$Fe$_z$PO$_4$", wherein the following conditions may be satisfied: 0≤x≤1, 0≤y≤1, 0≤z≤1, and x+y+z=1.

The first cathode may include a lithium cobalt oxide.

According to an embodiment, a rechargeable battery may include a case including a first face and a second face; an inner electrode assembly including at least one first unit cell, the at least one first unit cell including a first cathode, a first separator, and a first anode; and outer electrode assemblies each including at least one second unit cell, the at least one second unit cell including a second cathode, a second separator, and a second anode. The first cathode may include a lithium cobalt oxide, the first anode may include graphite, the second cathode may include a lithium phosphate having an olivine structure and containing a transition metal, and the second anode may include a lithium titanium oxide. The outer electrode assemblies may be disposed within the case to be adjacent to the first face and the second face, respectively, and the inner electrode assembly may be interposed between the outer electrode assemblies. The charge or discharge capacity of the inner electrode assembly may be 50% or more and 95% or less of the total charge or discharge capacity of the battery.

While the disclosure has been shown and described with reference to certain embodiments thereof, it will be understood by those skilled in the art that various changes in form and details may be made therein without departing from the spirit and scope of the disclosure as defined by the appended claims.

What is claimed is:

1. A battery comprising:
a case including a first face and a second face;
a first unit cell including a first cathode, a first separator, and a first anode, the first anode being formed using graphite having a first electrical conductivity when the first unit cell is discharged; and
a plurality of second unit cells, each including a second cathode, a second separator, and a second anode, the second anode being formed using a lithium titanium oxide having a second electrical conductivity lower than the first electrical conductivity when the plurality of second unit cells are discharged,
wherein the plurality of second unit cells are disposed within the case to be adjacent to the first face and the second face, respectively, and the first unit cell is interposed between the plurality of second unit cells,
wherein the second cathode includes a lithium phosphate having an olivine structure and containing manganese.

2. The battery of claim 1, wherein a first one of the plurality of second unit cells is disposed adjacent to the first face and a second one of the plurality of second unit cells is disposed adjacent to the second face, and
wherein the first one of the plurality of second unit cells and the second one of the plurality of second unit cells are connected in a series connection structure with each other, and the first unit cell is connected in parallel with the series connection structure of the first one of the plurality of second unit cells and the second one of the plurality of second unit cells.

3. The battery of claim 1, wherein the first cathode includes a lithium cobalt oxide, and
wherein the first anode includes graphite.

4. The battery of claim 1, wherein the first unit cell is wound to include a stacked structure in which a portion of the first unit cell is stacked with another portion of the first unit cell, and
wherein at least one of the plurality of second unit cells is wound to include a structure in which a portion of the at least one of the plurality of second unit cells is stacked with another portion of the at least one of the plurality of second unit cells.

5. The battery of claim 4, wherein a wound number of the plurality of second unit cells is at least 5% and no greater than 50% of a sum of a wound number of the first unit cell and the wound number of the plurality of second unit cells.

6. The battery of claim 1, further comprising a second one of the first unit cell, wherein the first unit cell and the second one of the first unit cell are stacked, and
wherein the plurality of second unit cells are stacked together with the first unit cell and the second one of the first unit cell.

7. The battery of claim 6, wherein a stacked number of the plurality of second unit cells is at least 5% and no greater than 50% of a sum of a stacked number of the first unit cell and the second one of the first unit cell and the stacked number of the plurality of second units.

8. The battery of claim 1, wherein the lithium phosphate containing at least one of cobalt, manganese, and iron, the lithium phosphate being a composition having a chemical formula of:

LiCo$_x$Mn$_y$Fe$_z$PO$_4$, wherein 0≤x≤1, 0≤y≤1, 0≤z≤1, and x+y+z=1.

9. The battery of claim 8, wherein the second anode includes a lithium titanium oxide having a composition of Li$_4$Ti$_5$O$_{12}$.

10. The battery of claim 9, wherein the first cathode includes a lithium cobalt oxide.

11. The battery of claim 1, wherein the case includes a pouch or a can structure that encapsulates the first unit cell and the plurality of second unit cells.

12. The battery of claim 1, wherein the second anode includes a material having an electrical conductivity that is lower in a discharged state than in a charged state.

13. An electronic device comprising:
a circuit element; and
a battery electrically connected to the circuit element, wherein the battery includes:
  a case including a first face and a second face;
  a first unit cell including a first cathode, a first separator, and a first anode, the first anode being formed using graphite having a first electrical conductivity when the first unit cell is discharged; and
  a plurality of second unit cells, each including a second cathode, a second separator, and a second anode, the second anode being formed using a lithium titanium oxide having a second electrical conductivity lower than the first conductivity when the plurality of second unit cells are discharged,
wherein the plurality of second unit cells are disposed within the case to be adjacent to the first face and the second face, respectively, and the first unit cell is interposed between the plurality of second unit cells,
wherein the second cathode includes a lithium phosphate having an olivine structure and containing manganese.

14. The electronic device of claim 13, wherein the second cathode includes a composition having chemical formula of:

$$LiCo_xMn_yFe_zPO_4,$$

wherein 0≤x≤1, 0≤y≤1, 0≤z≤1, and x+y+z=1.

15. The electronic device of claim 14, wherein the first cathode includes a lithium cobalt oxide.

* * * * *